United States Patent Office 3,222,054
Patented Dec. 7, 1965

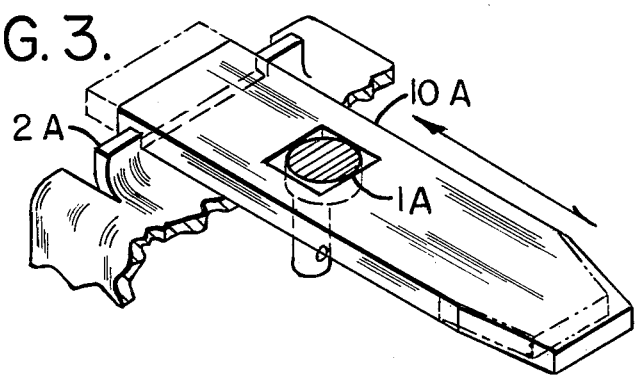
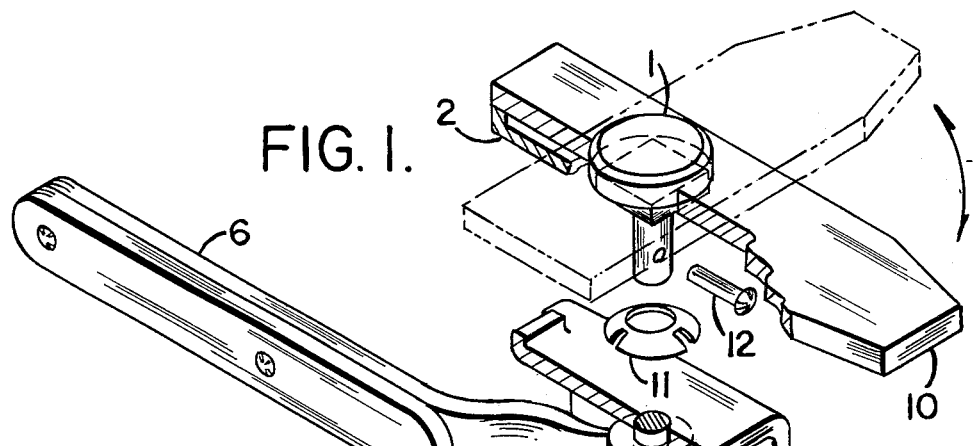
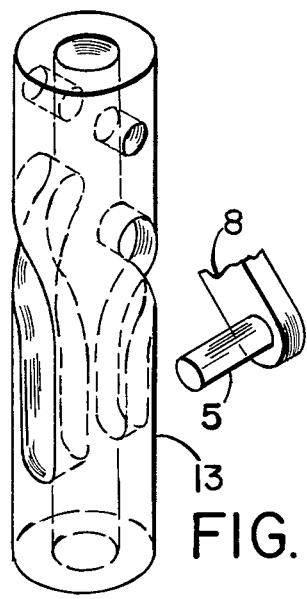

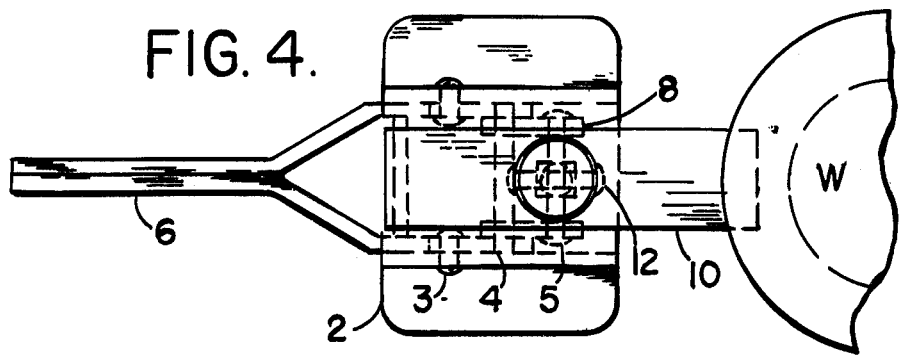
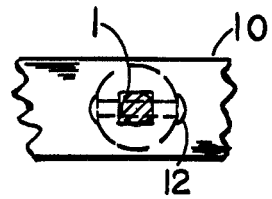
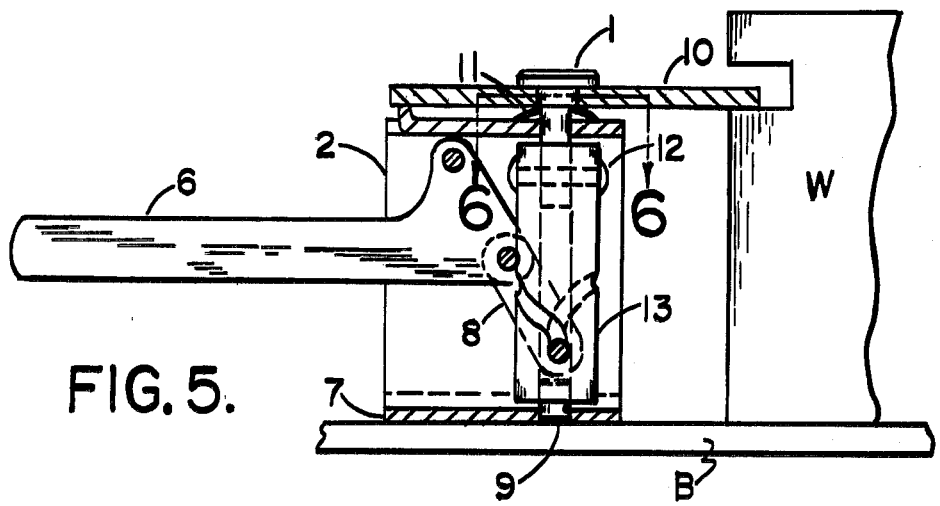

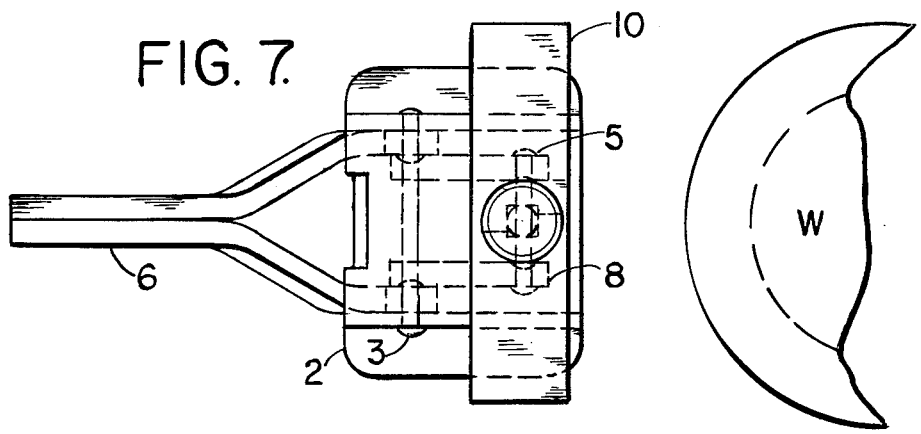
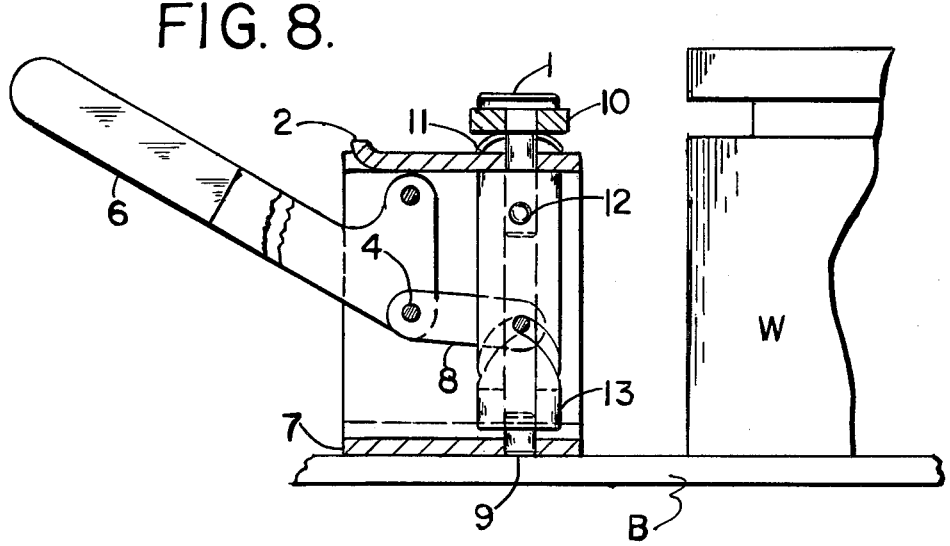

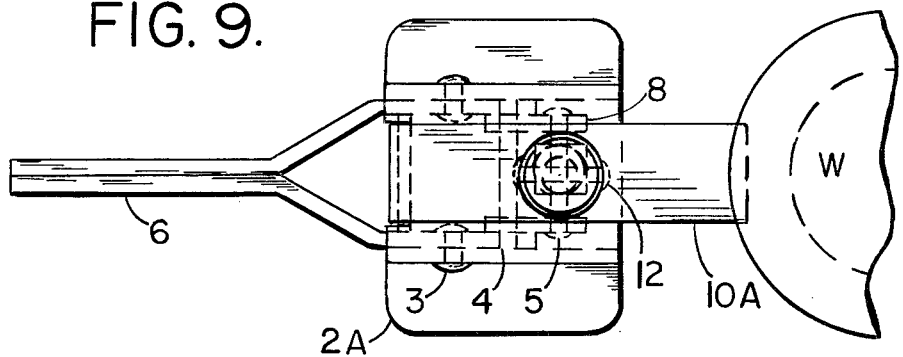
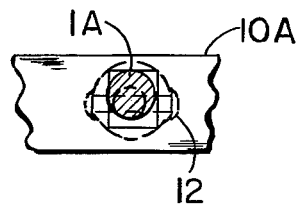
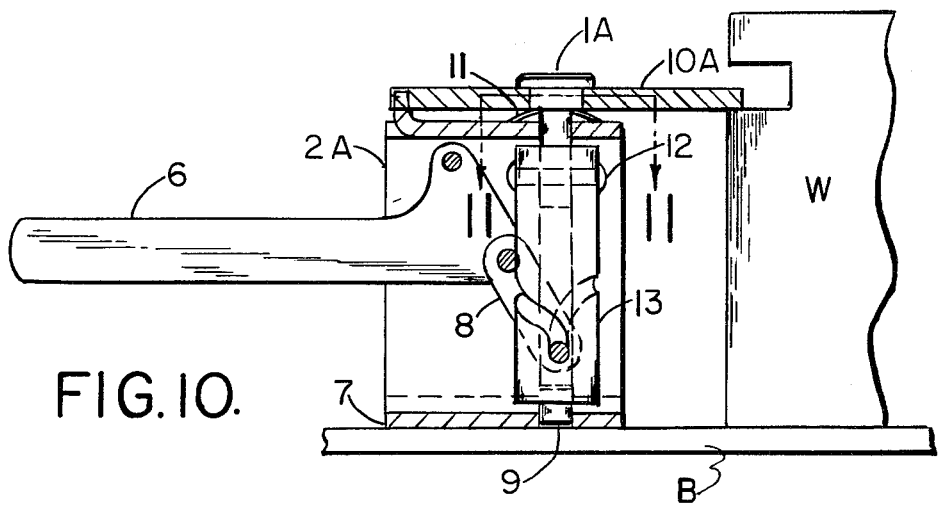

3,222,054
CLAMPING DEVICE
Anthony A. Bisulca, 45 Elwood Road; James W. Cunningham, 52 Tidewater Ave.; and Andrew A. Warenius, 47 James St., all of Nassau County, N.Y.
Filed May 29, 1962, Ser. No. 198,575
3 Claims. (Cl. 269—93)

This invention relates to a work-holding device with a controlled clamping mechanism.

The object of this invention is to clamp simply, repetitively, and accurately by means of a radial clamp arm so that the arm horizontally swings in, clamps and locks the workpiece in one simple motion.

Another object of this invention is to clamp simply, repetitively and accurately by means of an axial clamp arm moving in a linear direction which clamps and locks the workpiece in position in one simple motion.

Another object of this invention is to control the vertical rise of the clamp arm off the clamping surface of the workpiece and move away in a horizontal plane radially or axially. For example: move into and out of groove or undercut.

Another object of this invention is the activating method used which consists of a mechanical advantage linkage in conjunction with a barrel cam activated center post and cam or box activator.

Further objects, features and advantages of this invention will become apparent from the following descriptions read in view of accompanying drawings forming part of this application and which like numericals are used to designate like parts throughout the same.

FIGURE 1 is a partially exploded isometric and cutaway view of the workpiece holding clamp including a swinging clamp arm.

FIGURE 2 is an enlarged detailed view of the barrel cam activated center post.

FIGURE 3 is a partial isometric view of a modification of the workpiece holding clamp including a linearly movable clamp arm.

FIGURE 4 is a top view of the workpiece holding clamp with the swinging clamp arm and workpiece in clamped and locked position.

FIGURE 5 is a front cutaway view of the workpiece holding clamp with the swinging clamp arm and workpiece in the clamped and locked position.

FIGURE 6 is a sectional view on line 6—6 of FIGURE 5 showing a cross section of the actuator in the swinging clamp arm.

FIGURE 7 is a top view of the workpiece holding clamp with the swinging clamp arm in the released and radially moved away position.

FIGURE 8 is a front cutaway view of the workpiece holding clamp with the swinging clamp arm in the released and radially moved away position.

FIGURE 9 is a top view of the workpiece holding clamp with the linear clamp arm and workpiece in clamped and locked position.

FIGURE 10 is a front cutaway view of the workpiece holding clamp with the linear clamp arm and the workpiece in a clamped and locked position.

FIGURE 11 is a sectional view on line 11—11 of FIGURE 10 showing a cross section of the cam actuator in the linear clamp arm.

Figure 12:
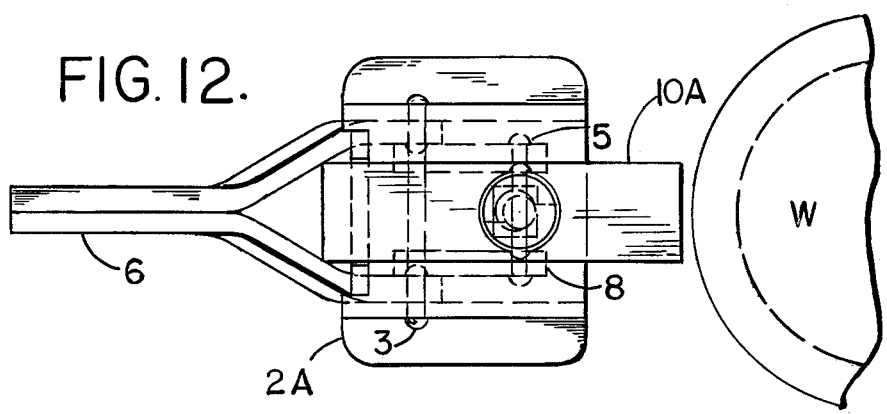
FIGURE 12 is a top view of the workpiece holding clamp with the linear clamp arm in released and axially moved away position.

It will be understood that the above drawings illustrate merely a preferred embodiment of the invention in that the locking means is a commonly used toggle and that other embodiments are contemplated within the scope of the claims hereinafter set forth.

Figure 13:
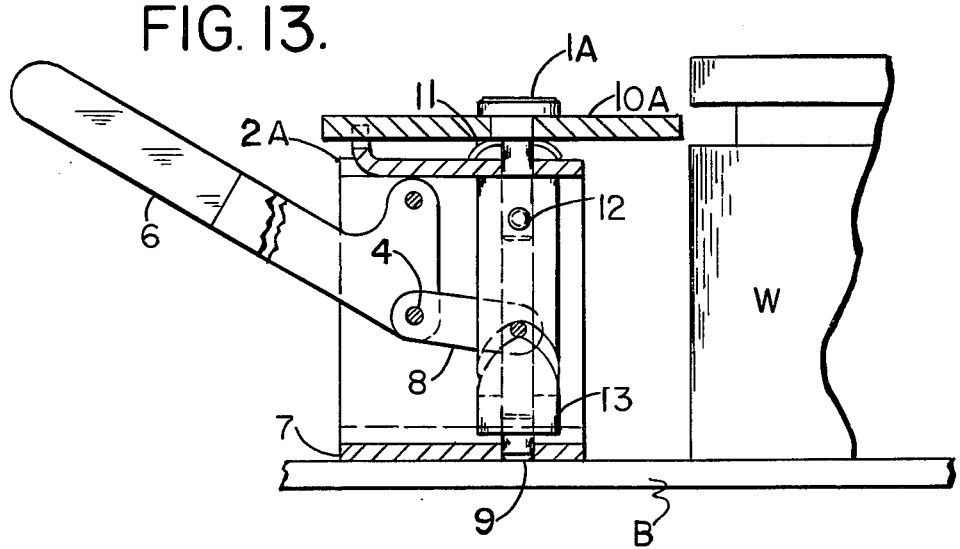
FIGURE 13 is a front cutaway view of the workpiece holding clamp with the linear clamp arm in the released and axially moved away position.

Referring to the drawing, the construction as shown in FIGURE 1 is as follows: 2 is a formed metal heel frame assembled to a base frame 7 by means of a spot weld or other common fastening method. An actuator handle 6 is pivoted within the heel frame 2 by means of two rivets, 3. The actuator handle 6 will move radially about the rivets 3. The stop pin 4 is slip fitted through the forward end of the actuator handle 6 and also the linkage bars 8. The stop pin 4 is prevented from lateral movement by being loosely captured within the heel frame 2. This stop pin 4 is the over center toggle lock which banks against the barrel cam activated center post 13 whose function will become more apparent in further description. The barrel cam activated center post 13 is cylindrical in shape and has a thru helical slot for a given distance to accomplish rotation, and leading into a straight slotted portion to accomplish vertical rise and fall. The barrel cam activated center post 13 is held in place within the frame assembly by means of 9 and 1 which will be further described later. The barrel cam activated center post 13 separates the linkage bars 8 which are connected by the actuator rivet 5 which also passes thru the slot in the barrel cam activated center post 13. This actuator rivet 5 is the motivating force of the barrel cam activated center post, 13. The barrel cam activated center post 13 is held in a radial and axial location by means of the pivot pin 9 which is press-fitted into the base frame 7 and slip-fitted within the center hole of the barrel cam activated center post 13 and is also held by the actuator 1 which passes thru the swinging clamp arm 10, spring washer 11, guide hole within the heel frame 2, and into the center hole of the barrel cam activated center post 13 where it is pinned in a proper location by the drive pin rivet 12. The actuator 1 is a cylindrical stepped part having a square or noncircular projection depending downwardly therefrom which fits within a like square or noncircular hole in the swinging clamp arm 10 for the purpose of radially driving the swinging clamp arm 10. The heel frame 2 is so designated because it contains as an integral part a raised portion to allow the swinging clamp arm 10 to bear down for the purpose of attaining clamping pressure between the raised portion of the heel frame and the workpiece. A modification of the workpiece holding clamp to obtain a linear movement of the clamp arm prior to clamping is described as follows:

Referring to the modification as shown in FIGURES 3, 9, 10, 11, 12, and 13: a formed metal guide heel frame 2A is assembled to a base 7 by means of a spot weld or other common fastening method. An actuator handle 6 is pivoted within the guide heel frame 2A by means of two rivets 3. The actuator handle 6 will move radially about rivets 3. The stop pin 4 is slip-fitted through the forward end of the actuator handle 6 and also the linkage bars 8.

The stop pin 4 is prevented from lateral movement by being loosely captured within the guide heel frame 2A. This stop pin 4 is the over center toggle lock which banks against the barrel cam activated center post 13 whose function will become more apparent in further description. The barrel cam activated center post 13 is cylindrical in shape and has a thru helical slot for a given distance to accomplish rotation and leading into a straight slotted portion to accomplish vertical rise and fall. The barrel cam activated center post 13 is held in place within the frame assembly by means of 9 and 1A which will be further described later. The barrel cam activated center post 13 separates the linkage bars 8 which are connected by the actuator rivet 5 which also passes thru the slot in the barrel cam activated center post 13. This actuator rivet 5 is the motivating force of the barrel cam activated center post 13. The barrel cam activated center post 13 is held in radial and axial location by means of the pivot pin 9 which is press fitted into the base frame 7 and slip fitted within the center hole of the barrel cam activated center post 13 and is also held by the cam actuator 1A which passes thru the linear clamp arm 10A, spring washer 11, guide hole within the guide heel frame 2A and into the center hole of the barrel cam activated center post 13 where it is pinned in proper location by the drive pin rivet 12. The cam actuator 1A is a cylindrically stepped part having a projection forming a cam member depending downwardly therefrom located between top and bottom concentric diameters of the cam actuator 1A which is shown more clearly in FIGURE 13. The eccentric portion rotates within a rectangular opening machined in the linear clamp arm 10A which causes linear motion of the linear clamp arm 10A. The guide heel frame 2A is so designated because it contains as an integral part a U type, raised portion for purposes of guiding the linear clamp arm 10A and allowing it to bear down for the purpose of attaining clamping pressure between the raised portion of the guide heel frame 2A and workpiece.

To attain this clamped and locked position the following sequence of motions have taken place by means of depressing the actuator handle 6.

As pressure is applied to the actuator handle 6 which pivots on the rivets 3, the stop pin 4 moves radially forward activating the actuator rivet 5 through means of the linkage bars 8 which in turn motivates the barrel cam activated center post 13. During this action the barrel cam activated center post 13 pivots about the pivot pin 9 which is also fitted into the base frame 7. While rotation of the barrel cam activated center post 13 is taking place, it also rotates the actuator or cam actuator 1 or 1A which is permanently pinned by means of the drive pin rivet 12 through the barrel cam activated center post 13, thus moving the clamp arm 10 or 10A radially or linearly in a horizontal plane to the clamping position at which point the actuator rivet 5 is at the end of the helical slot about to enter the portion of the slot which is vertical to the barrel cam activated center post 13. The actuator rivet 5 continues moving in the straight portion of the slot in the barrel cam activated center post 13 to the bottom of the slot. At this point of continuous movement of the actuator handle 6, we begin the locking action by means of simultaneous motion of both the linkage and the controlled downward movement of the barrel cam activated center post 13. The positive locking action takes place as a result of the toggle locking pressure being applied to the barrel cam activated center post 13 thru the actuator rivet 5 which in turn pulls down the swinging clamp arm 10 or the linear clamp arm 10A to locked position on the workpiece and heel frame 2 or guide heel frame 2A.

The releasing action is the reverse of the clamping action with the additional feature of the controlled vertical rise of the swinging clamp arm 10 or the linear clamp arm 10A prior to the radial or linear disengagement of the workpiece. Vertical rise is facilitated by the spring washer 11.

We claim:

1. A workpiece holding clamp comprising, a base frame, a heel frame connected thereto, a barrel cam activated center post including a helical slot terminating between the ends thereof, said post being confined within said heel frame by means of a pivot pin slidably and pivotally engaging said post at one end, a clamping arm, a clamping arm actuator member connected to the other end of said post, said actuator member passing through said clamping arm and through a spring washer positioned between said clamping arm and said heel frame, a handle pivotally connected to said heel frame, linkage means pivotally connected to said handle, and a rivet connected to said linkage means, said rivet being slidably engaged in the slot of said post.

2. The workpiece holding clamp as defined in claim 1 wherein the clamping arm is provided with a noncircular opening therein engaged by a corresponding noncircular portion of said clamping arm actuator.

3. The workpiece holding clamp as defined in claim 1 wherein the clamping arm is provided with a noncircular opening therein engaged by a cam member carried by the clamping arm actuator member.

References Cited by the Examiner

UNITED STATES PATENTS

| | | | |
|---|---|---|---|
| 2,537,594 | 1/1951 | Lehmann | 269—229 |
| 2,600,584 | 6/1952 | Snell | 269—90 X |
| 3,009,694 | 11/1961 | Blatt | 269—90 |

WILLIAM W. DYER, JR., *Primary Examiner.*

THOMAS J. HICKEY, *Examiner.*